(12) United States Patent
Severac et al.

(10) Patent No.: US 11,366,029 B2
(45) Date of Patent: Jun. 21, 2022

(54) SENSOR AND TOUCH SCREEN WITH ENVIRONMENTAL COMPENSATION, ESPECIALLY FOR TEMPERATURE

(71) Applicant: NANOMADE CONCEPT, Toulouse (FR)

(72) Inventors: Fabrice Severac, Toulouse (FR); Nicolas Dufour, Vallegue (FR)

(73) Assignee: NANOMADE LAB., Toulouse (FR)

( * ) Notice: Subject to any disclaimer, the term of this patent is extended or adjusted under 35 U.S.C. 154(b) by 174 days.

(21) Appl. No.: 16/961,842

(22) PCT Filed: Jan. 14, 2018

(86) PCT No.: PCT/EP2018/050798
§ 371 (c)(1),
(2) Date: Jul. 13, 2020

(87) PCT Pub. No.: WO2018/130672
PCT Pub. Date: Jul. 19, 2018

(65) Prior Publication Data
US 2021/0239546 A1 Aug. 5, 2021

(51) Int. Cl.
*G01L 1/20* (2006.01)
*G06F 3/041* (2006.01)
*B82Y 30/00* (2011.01)
*G01L 1/18* (2006.01)

(52) U.S. Cl.
CPC .............. *G01L 1/205* (2013.01); *B82Y 30/00* (2013.01); *G01L 1/18* (2013.01); *G06F 3/0414* (2013.01); *G06F 2203/04105* (2013.01)

(58) Field of Classification Search
CPC . G01L 1/205; G01L 1/18; B82Y 30/00; G06F 3/0414; G06F 2203/04105
See application file for complete search history.

(56) References Cited

U.S. PATENT DOCUMENTS

| | | |
|---|---|---|
| 2013/0181726 A1 | 7/2013 | Mallet et al. |
| 2015/0205481 A1 | 7/2015 | Severac et al. |
| 2016/0103545 A1 | 4/2016 | Filiz et al. |
| 2019/0155450 A1* | 5/2019 | Kim ........................ G01L 1/26 |
| 2020/0293149 A1* | 9/2020 | Hwang ................ G06F 3/0446 |
| 2020/0326817 A1* | 10/2020 | Park ..................... G06F 3/0416 |

FOREIGN PATENT DOCUMENTS

| | | |
|---|---|---|
| EP | 2877911 B1 | 9/2018 |
| EP | 2601491 B1 | 10/2018 |
| FR | 2 963 445 A1 | 2/2012 |
| WO | 2004/025234 A1 | 3/2004 |
| WO | 2015/106183 A1 | 7/2015 |

\* cited by examiner

*Primary Examiner* — Kenneth B Lee, Jr.
(74) *Attorney, Agent, or Firm* — Im IP Law; Chai Im; C. Andrew Im

(57) ABSTRACT

A compensated pressure or force sensor, especially for temperature, includes a substrate and on one side of the substrate, a first assembly of multilayer nanoparticles between the first pair of electrodes. On the same side of the substrate, near the first assembly, a second assembly of monolayer nanoparticles between the second pair of electrodes. The sensor additionally includes an electronic circuit configured to measure the variation of an electrical property of the first and second nanoparticle assemblies and to combine the measurements. A touch screen utilizing such sensor is provided.

7 Claims, 3 Drawing Sheets

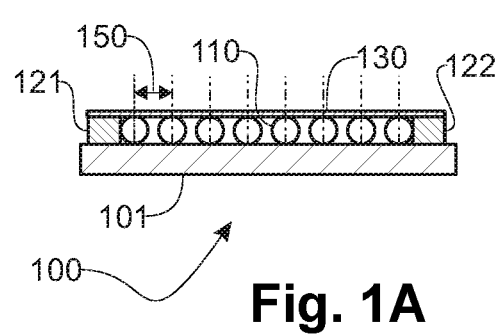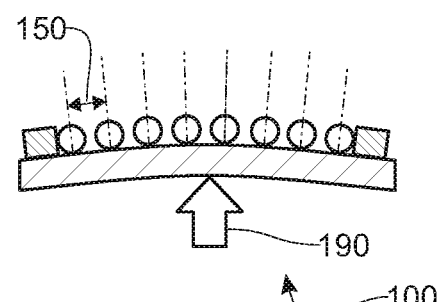
Fig. 1A  Fig. 1B
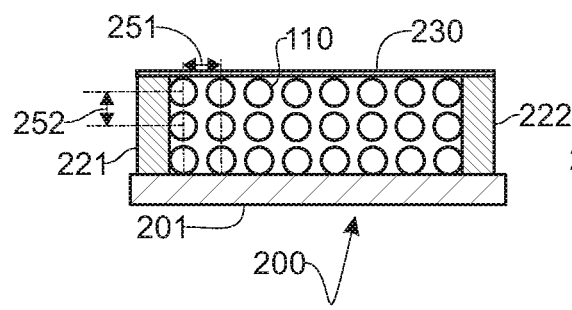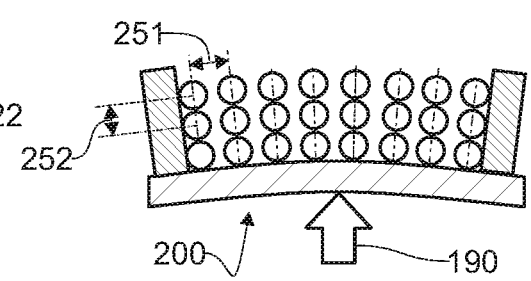
Fig. 2A  Fig. 2B
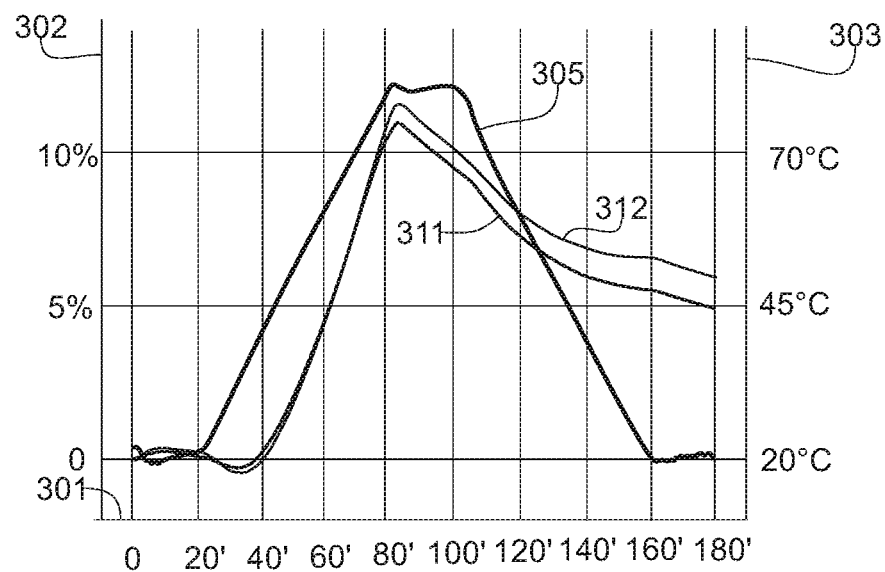
Fig. 3

SENSOR AND TOUCH SCREEN WITH ENVIRONMENTAL COMPENSATION, ESPECIALLY FOR TEMPERATURE

RELATED APPLICATIONS

This application is a § 371 application of PCT/EP2018/050798 filed Jan. 14, 2018, which is incorporated herein by reference in its entirety.

FIELD OF THE INVENTION

The invention relates to a force sensor and a touch screen comprising environmental sensitivity compensation, notably with regard to temperature. The invention is more particularly, but not exclusively, intended for communicating objects comprising a screen provided with a touch interface, such as a smartphone, a tablet PC, a microcomputer or a touch screen watch. Interaction between a user and such an object takes place via said touch screen, either directly between the user's finger and said screen or even by means of a stylus. To this end, according to the prior art, transparent sensors are connected to the screen, which allow a contact and the location of this contact on the surface of the screen to be detected and, in more advanced versions, also allow to measure the applied contact pressure or the contact force intensity. These sensors are, for example, transparent films with piezoelectric or piezoresistive properties. Advantageously, said films are replaced by sensors using nanoparticles and featuring a higher sensitivity.

BACKGROUND OF THE INVENTION

Document EP2601491 describes an exemplary embodiment of a sensor using nanoparticles and its manufacturing process.

Document EP2877911 describes an exemplary embodiment of a transparent touch-sensitive surface using such a sensor.

The sensors according to these exemplary embodiments produce a variation in an electrical property of the nanoparticle assembly forming each elementary sensor, under the effect of a micro-deformation applied to said nanoparticle assembly, the micro-deformation resulting from the force or pressure applied to the sensor or the substrate supporting it, and which has the effect of changing the distance between the nanoparticles forming the assembly. As non-limiting examples, the measured electrical properties that are responsive to the distance between the nanoparticles are the electrical resistivity or the capacitance of said assembly.

However, these electrical properties are also influenced by environmental factors and specifically by the temperature, so that, in order to perform a measurement of the pressure applied to an elementary sensor, independent from the conditions of use for the apparatus featuring such a touch screen, there must be a compensation of the influence of these environmental factors, and particularly of the temperature.

Document WO 2015/106183 discloses an exemplary embodiment of a transparent touch sensor embodying such temperature compensation.

According to the teachings of this document, the elementary sensor comprises two force sensitive measuring layers, placed on each side of a transparent substrate. Thus, when a pressure, substantially perpendicular to the substrate, is applied to said sensor, the upper sensitive layer is subjected to compression and produces a resulting variation in the electrical property, while the lower sensitive layer, on the other side of the substrate, is subject to tension and produces an opposite variation in the electrical property measured. However, a variation in the temperature to which such a sensor is exposed, produces the same variation in the electrical property measured for each of the layers. Thus, according to the principle of double weighing, it is possible to measure the variation in the electrical property resulting from the force applied, while eliminating the influence of temperature, by combining measurements taken from the two layers. Nevertheless, this exemplary embodiment is complex to implement because of the need to print a sensitive layer on both sides of the substrate.

OBJECT AND SUMMARY OF THE INVENTION

The aim of the invention is to eliminate the drawbacks of the prior art and, to this end, relates to a pressure or force sensor capable of implementing an environmental sensitivity compensation, especially for temperature, and comprising:
  a. a substrate,
  b. on one side of said substrate, a first multi-layer of nanoparticles assembly between two electrodes,
  c. on the same side of the substrate, and close to the first assembly, a second single-layer of nanoparticles assembly, between two electrodes, and
  d. an electronic circuit for measuring the variation in an electrical property of the first and second nanoparticles assemblies and for combining these measurements so as to implement a compensation.

Thus, the sensor of the invention uses the difference in response between a multi-layer assembly and a single-layer assembly to compensate for the effect of an environmental factor, like temperature, while retaining a coplanar configuration, on the same side of the substrate, of both the assemblies.

The invention is advantageously implemented according to the embodiments and variants exposed hereunder, that shall be considered individually or according any technically operative combination.

According to an exemplary embodiment, the electronic circuit measures the variation in resistance of the two assemblies and comprises two control resistances, with fixed values, the two nanoparticles assemblies and the control resistances being connected according to a half Wheatstone bridge circuit. This embodiment is the most compact, as the control resistances are placed within the measuring circuit, advantageously at a distance from the assemblies of nanoparticles. The circuit using a Wheatstone bridge further allows the linearity and sensitivity of the sensor to be improved in comparison to solutions from the prior art using a single elementary force sensor.

According to another embodiment, the sensor of the invention, comprises:
  e. close to the two assemblies of nanoparticles, an additional multi-layer assembly of nanoparticles between two electrodes,
  f. close to the three assemblies of nanoparticles, an additional single-layer assembly of nanoparticles, and
  wherein the 4 assemblies of nanoparticles are connected according to a full Wheatstone bridge circuit.

In addition to temperature compensation, this embodiment allows other effects of deformation on the sensor element to be measured or compensated for, for example, torsional deformation of the substrate.

According to variants of the latter embodiment:
the 4 nanoparticle assemblies are bonded to the same side of the substrate, or
the additional assemblies of nanoparticles are bonded to the opposite side of the substrate with respect to the first and second assemblies of nanoparticles.

The invention also relates to a touch screen comprising a plurality of sensors according to the invention, wherein the first assembly of nanoparticles is juxtaposed with the second assembly of nanoparticles. Such a touch screen allows the location of a contact on the surface of the screen to be measured, as well as the force applied at this point of contact, in a compensated manner as regards to environmental factors influencing the output delivered by each elementary sensor.

BRIEF DESCRIPTION OF THE DRAWINGS

The invention is disclosed hereunder according to its preferred embodiments, which are in no way exhaustive, and with reference to FIGS. 1 to 8, wherein:

FIGS. 1A-1B are schematic sectional views of an exemplary embodiment of a single-layer deformation sensor using an assembly of nanoparticles, FIG. 1A without load, FIG. 1B under mechanical load;

FIG. 2A-2B are schematic sectional views of an exemplary embodiment of a multi-layer deformation sensor using an assembly of nanoparticles, FIG. 2A without load, FIG. 2B under mechanical load, in FIGS. 1B and 2B, the passivation layer of the sensors in not shown in order to ease the viewing;

FIG. 3 shows an example of the change in the nominal resistance of a single-layer elementary sensor and a multi-layer elementary sensor when subjected to temperature change;

DETAILED DESCRIPTION OF THE EMBODIMENTS

Figure 4:
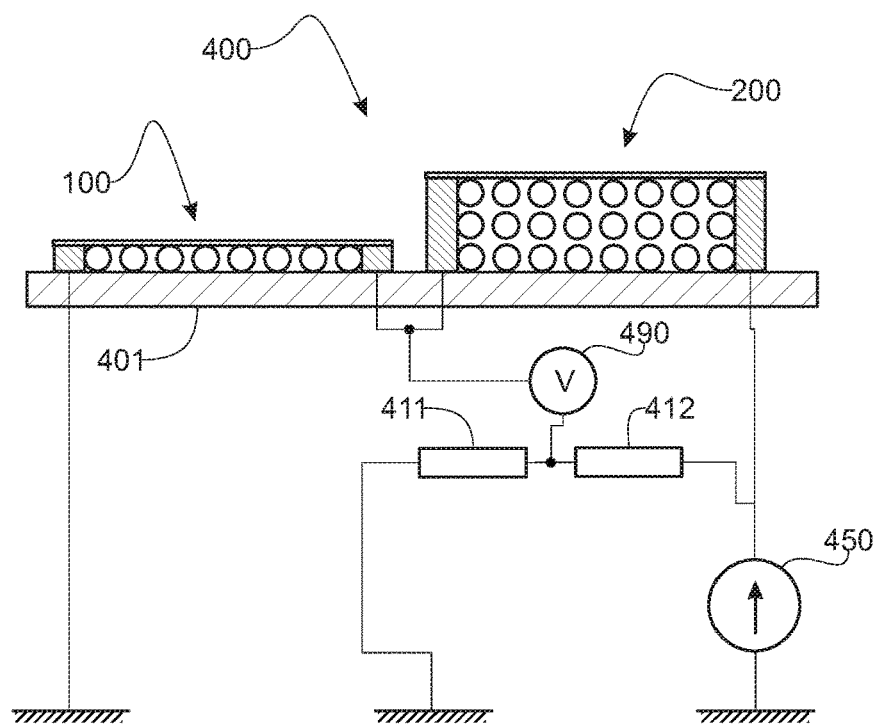
FIG. 4 is a sectional view of an exemplary embodiment of a temperature-compensated sensor according to the invention, using a multi-layer elementary sensor and a single-layer elementary sensor connected according to a half Wheatstone bridge circuit.

FIG. 1A according to an exemplary embodiment, a single-layer deformation elementary sensor (100), comprises a substrate (101) to which is bonded a conductive or semi-conductive assembly (110) of nanoparticles in a colloidal suspension in an electrically insulating ligand. As a non-limiting example, to make a transparent or translucent sensor, said nanoparticles (110) are tin doped indium oxide particles ($In_2O_3$—$SnO_2$), or ITO, and the ligand is an (aminomethyl) phosphonic acid. Said assembly is positioned between electrodes (121, 122) and electrically connected to these electrodes, the electrodes being for example made of ITO. Thus, according to this embodiment, the electrodes and the assembly of nanoparticles are transparent. The set comprising the electrodes (121, 122) and the assembly of nanoparticles are bonded to the substrate (101), which is itself transparent, for example made from polyethylene terephtalate, or PET, to make a soft touch-sensitive surface, or even silicon dioxide ($SiO_2$), to make a rigid touch-sensitive surface. According to another exemplary embodiment, the flexible substrate is bonded to a rigid support. According to an exemplary embodiment, a passivation layer (130) is deposited on the assembly of nanoparticles. This transparent layer, of an organic or ceramic nature, protects from external damage the assembly of nanoparticles and the device implementing this assembly of nanoparticles. Said passivation layer (130) is dimensioned according to the material of which it is made of, so that it allows mechanical loads to be transmitted to the assembly of nanoparticles. As a non-limiting example, the passivation layer is made of a polyimide, silicon dioxide ($SiO_2$) or silicon nitride ($Si_3N_4$). The nanoparticles (110) are deposited on the substrate by any method known from the prior art, particularly by using the convective capillary deposition method or the drop evaporation method, as disclosed in document EP2877911. The nanoparticle layer (110) is firmly bonded to the substrate (101), for example, using a chemical coupling agent. As an example, the chemical coupling agent is a silane ($SiH_4$) capable of interacting with OH groups on the surface of the substrate previously activated by a UV-Ozone treatment and comprising, at the other end, the coupling agent for a carboxyl group (COOH) capable of grafting onto an amine group ($NH_2$) previously grafted onto the surface of nanoparticles. The assembly of nanoparticles forms a strain gauge, the resistance of which varies depending on the relative distance between the nanoparticles of the assembly. This variation in conductivity is attributed to tunnelling conductance between the nanoparticles, and this effect provides a very high gauge factor, which is far higher than what can be achieved with a piezoresistive film, and allows very low deformation to be measured. By way of example, the proportional variation in the resistance of such an elementary sensor consisting of an assembly of ITO nanoparticles in a phosphonic acid based ligand, causes an exponential change in the response depending on the deformation undergone by said elementary sensor (100), with a gauge factor reaching a value of 85 over a range of deformation from −1% under compression to +1% under tension with a resistance in the order of $2000 \cdot 10^3$ Ohm in the absence of deformation.

FIG. 1B, according to an exemplary embodiment, when a mechanical load (190) is applied to the substrate, the nanoparticle layer is under tension and the relative distance (150) between the nanoparticles of the assembly increases, causing an increase in the resistivity of said assembly and the resistance of the single-layer elementary sensor (100).

FIG. 2A, according to an exemplary embodiment, a multi-layer deformation sensor (200) comprises a substrate (201), to which is connected an assembly comprising several layers of nanoparticles in colloidal suspension in a ligand, and electrodes (221, 222). The sensor advantageously comprises a passivation layer (230). The nature of the nanoparticles, the ligand, the substrate, the electrodes and the passivation layer are the same as for the single-layer sensor, as are the manufacturing techniques, with the single-layer or multi-layer aspect of the sensor being obtained during manufacturing, for example when using convective capillary deposition or by the quantity of nanoparticles contained in the evaporated drop, according to the manufacturing methods as described in document EP2877911. The first nanoparticle layer is firmly bonded to the substrate (201), for example, using a chemical coupling agent, while the following layers are bonded together by the ligand in the colloidal suspension. The gauge factor of such a sensor is of the same order of magnitude as the one of a single-layer sensor.

FIG. 2B, when a mechanical load (190) is applied to the multi-layer sensor (200), the assembly of nanoparticles is subjected to tension, which causes an increase in the relative distance (251) between the nanoparticles in a direction substantially tangent to the substrate (201), but also, by a necking effect, a reduction in the distance (252) between the layers in a direction substantially perpendicular to the substrate. In practice, the necking effect is predominant and the resistivity of the assembly, as well as the resistance of the sensor, decrease with the intensity of the force (190) applied.

FIG. 3, when one or the other of the elementary sensors disclosed hereinabove is subjected to a temperature change, the nominal resistance of the considered sensor changes. Thus, by subjecting each of the elementary sensors to a temperature (303) cycle (305), in an oven, and without applying any load to the sensor, the proportional variations in the nominal resistances (302) of the single-layer sensor (311) and the multi-layer sensor (312) over time are similar.

To summarize, the response, in terms of resistance variation when the two sensors are subjected to the same mechanical load, is opposite for the multi-layer sensor, when compared to the single-layer sensor, while the variation of the nominal resistance of the two sensors, when they are subjected to a change in temperature, or another environmental influencing factor, are similar.

FIG. 4, these properties are advantageously used to make a sensor (400), that is compensated for environmental effects, especially for temperature, and comprising, on the same side of a same substrate (401), adjacent sensors, one single-layered (100) and one multi-layered (200). According to this exemplary embodiment, the two sensors (100, 200) are connected by an electronic circuit, according to a half Wheatstone bridge configuration, comprising 2 control resistances (411, 412) with a fixed value, a DC power source (450), for example +5 Volts, and a voltmeter type measuring device (490) to measure the voltage difference between the two branches of the half-bridge. The technique for measuring deformation using a Wheatstone bridge is known from the prior art and is not further explained. According to this exemplary circuit using a half-bridge, the control resistances (411, 412) are integrated into the electronic circuit, at a distance from the sensors (100, 200).

Figure 5:
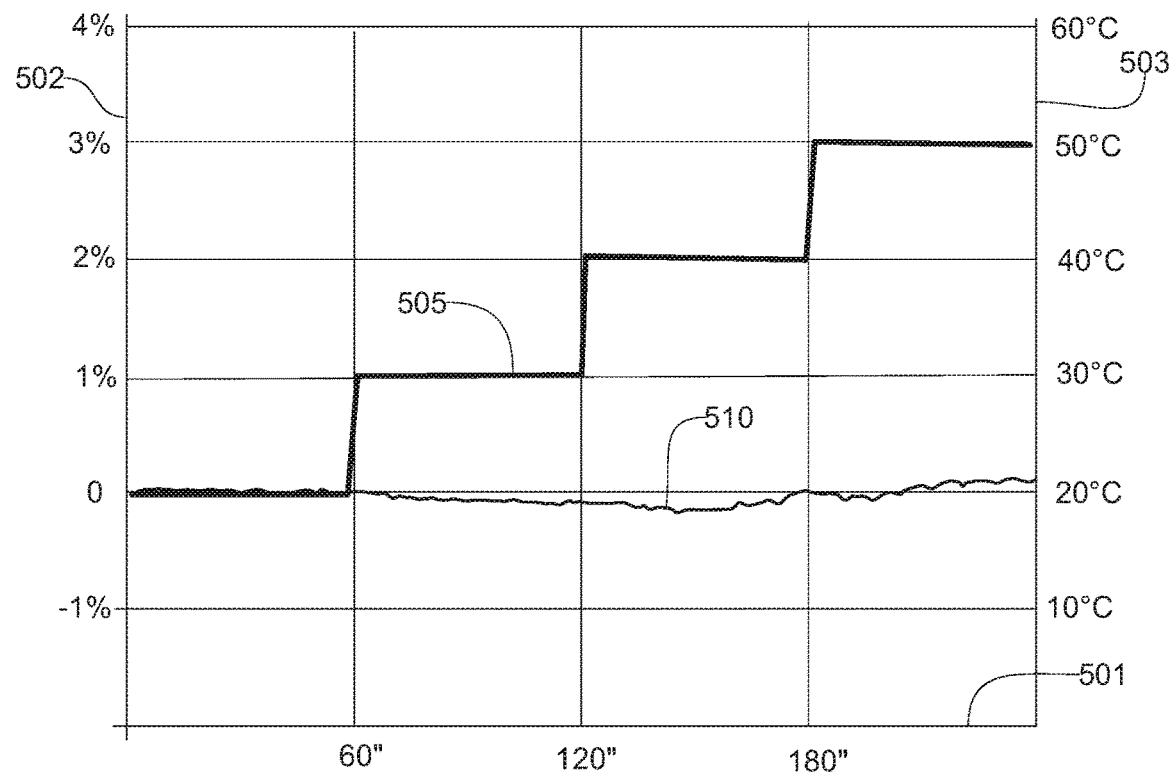
FIG. 5 is an example of the change in the nominal resistance of a sensor according to the invention, when the latter is subjected to a change in temperature.

FIG. 5, by using the temperature-compensated sensor and connection using a half-bridge, as shown in FIG. 4, the proportional change (510) over time (501) in the nominal resistance (502) when the sensor is subjected to a temperature (503) cycle (505) remains less than 0.2% over a range from 10° C. to 50° C., which demonstrates the effectiveness of the temperature compensation achieved in this way. In such a case, the sensor is subjected to a temperature variation using a heat gun while it is not mechanically loaded.

Figure 6:
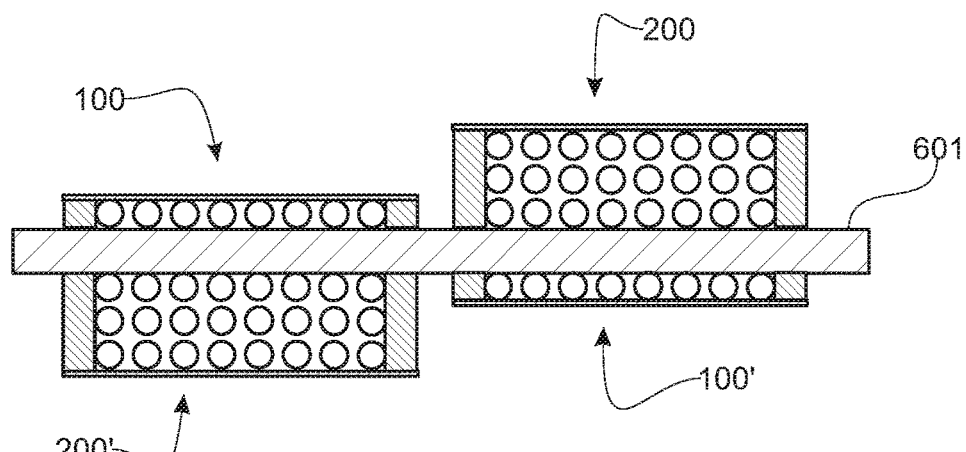
FIG. 6 is an exemplary embodiment, using a sectional view, of a sensor according to the invention implementing two single-layer elementary sensors and two multi-layer elementary sensors, attached to two opposite sides of a substrate and connected according to a full Wheatstone bridge circuit.

FIG. 6, the set using a full Wheatstone bridge is achieved by replacing the control resistances shown in FIG. 4, by elementary sensors (100', 200'), which are single-layered and multi-layered respectively, bonded to the same substrate (601) as the sensors (100, 200) used for the half-bridge circuit shown above, and close to the latter. According to the exemplary embodiment shown in this figure, the two other elementary sensors (100', 200') are attached to the opposite side of the substrate (601) as compared to the sensors (100, 200) of the first half-bridge.

Figure 7:
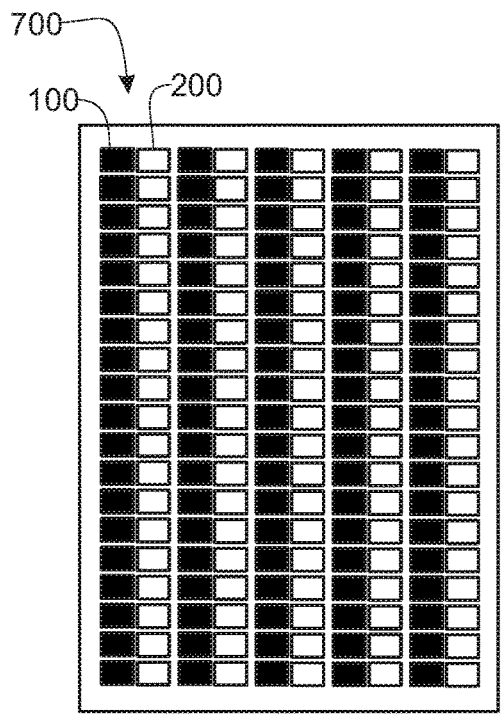
FIG. 7 shows a schematic front view of an exemplary embodiment of a touch screen implementing a network of half-bridge compensated sensors according to the invention.

FIG. 7, according to a first exemplary embodiment, a touch screen (700), which is sensitive to the intensity of the applied force, is obtained by combining in pairs, for example according to a matrix organisation, a series of pairs comprising a single-layered elementary sensor (100) and a multi-layered elementary sensor (200).

Figure 8:
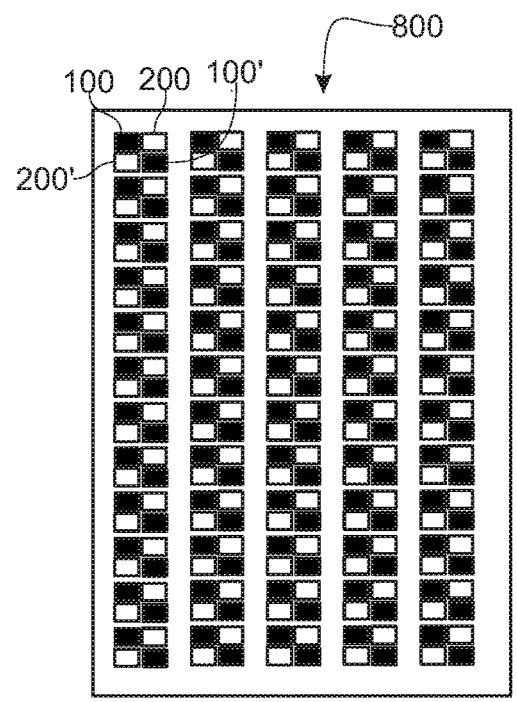
FIG. 8 shows a schematic front view of an exemplary embodiment of a touch screen implementing a series of elementary sensors each organized as a full Wheatstone bridge.

FIG. 8, according to another exemplary embodiment, the touch screen (800) implements a series of compensated sensors comprising two single-layered elementary sensors (100, 100') and two multi-layered elementary sensors (200, 200'), all attached to the same side of the substrate and connected as a full bridge. The use of a full bridge specifically allows the linearity of the response to be further improved and the sensitivity of the sensor to be increased in comparison to a implementation using a half-bridge.

The above description and the exemplary embodiments show that the invention achieves the desired purpose, more specifically, it allows to make a touch screen capable of measuring the intensity and the location of a contact on said screen, with compensation for the influence of uncontrolled environmental factors, especially temperature, while limiting functionalization to a single side of the functionalized surface. The use of elementary sensors using assemblies of nanoparticles in a colloidal suspension in a ligand, further allows high gauge factors and high measuring sensitivity to be obtained in comparison to piezoresistive films used for applications known from the prior art. The same principles allow for compensation of the effects of other environmental factors on the nominal resistance of sensor elements, such as light, exposure to UV radiation, humidity or other factors having a similar effect on said sensors. The application of the invention is not limited to touch screens and transparent sensors. By way of an example, the same principle can be used to make a non-transparent touch-sensitive surface, for example on the back or sides of a telephone or a tablet PC, on the strap of a touch screen watch, on a bed undersheet or even on a floor covering. The high sensitivity of the sensors according to the invention specifically allows a heart rate or respiratory rate to be measured or, when used on a floor covering, movement or a fall to be detected.

The invention claimed is:

1. A pressure or force sensor configured to implement an environmental sensitivity compensation, particularly for a temperature, comprising:
    a substrate;
    on one side of the substrate, a first multi-layer assembly of nanoparticles between a first pair of electrodes;
    on a same side of the substrate and proximity to the first assembly, a second single-layer assembly of nanoparticles between a second pair of two electrodes; and
    an electronic circuit configured to measure a variation in an electrical property of the first and second assemblies, and to combine measurements to implement the environmental sensitivity compensation.

2. The sensor of claim 1, wherein the electronic circuit measures the variation in a resistance of the first and second assemblies, and the electronic circuit comprises two control resistances, with fixed values; and wherein the first and second assemblies are connected to the two control resistances using a half Wheatstone bridge.

3. The sensor of claim 1, further comprising:
a third multi-layer assembly of nanoparticles between a third pair of electrodes in proximity to the first and second assemblies;
a fourth single-layer assembly of nanoparticles in proximity to the first, second and third assemblies; and
wherein the first, second, third and fourth assemblies are connected using a full Wheatstone bridge circuit.

4. The sensor of claim 3, wherein the first, second, third and fourth assemblies are bonded to the same side of the substrate.

5. The sensor of claim 3, wherein the third and fourth assemblies are connected to an opposite side of the substrate with respect to the first and second assemblies.

6. A touch screen comprising a plurality of sensors of claim 1, wherein the first assembly is juxtaposed with the second assembly.

7. A touch screen comprising a plurality of sensors of claim 3, wherein the first assembly is juxtaposed with the second assembly.

* * * * *